May 31, 1932.　　　W. W. BEALL　　　1,861,376
AUTOMOBILE TRANSMISSION
Filed Oct. 19, 1931　　　4 Sheets-Sheet 1
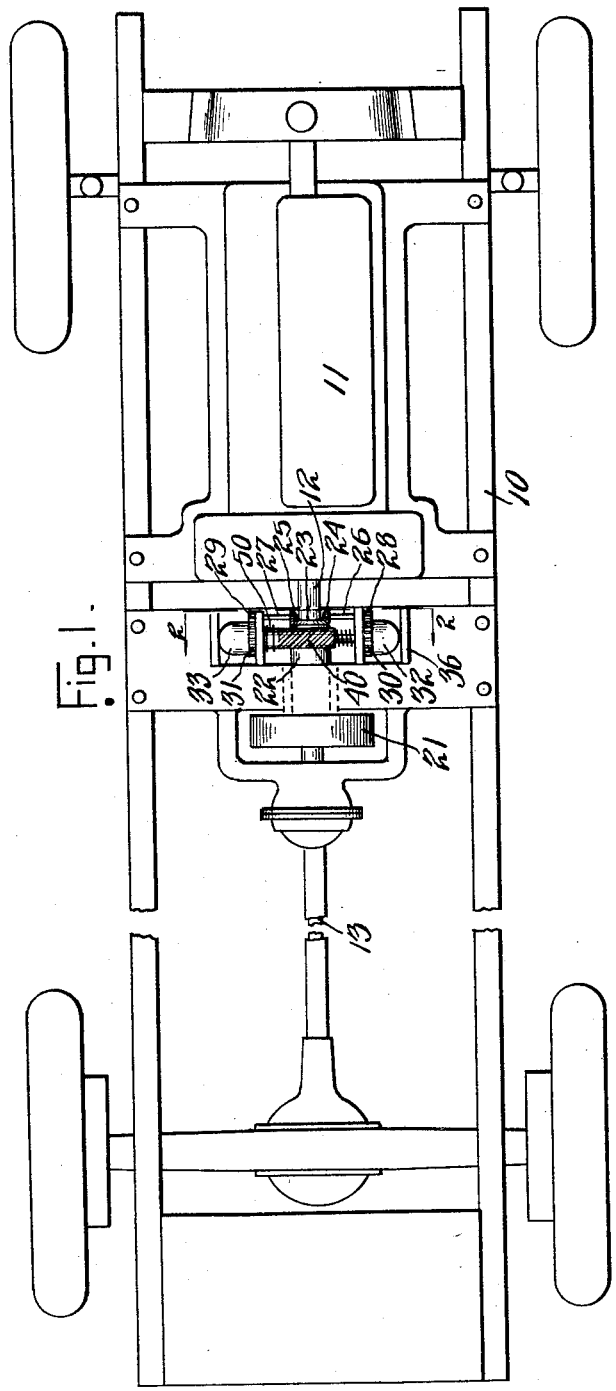
Inventor
William W. Beall May 31, 1932. W. W. BEALL 1,861,376
AUTOMOBILE TRANSMISSION
Filed Oct. 19, 1931 4 Sheets-Sheet 2
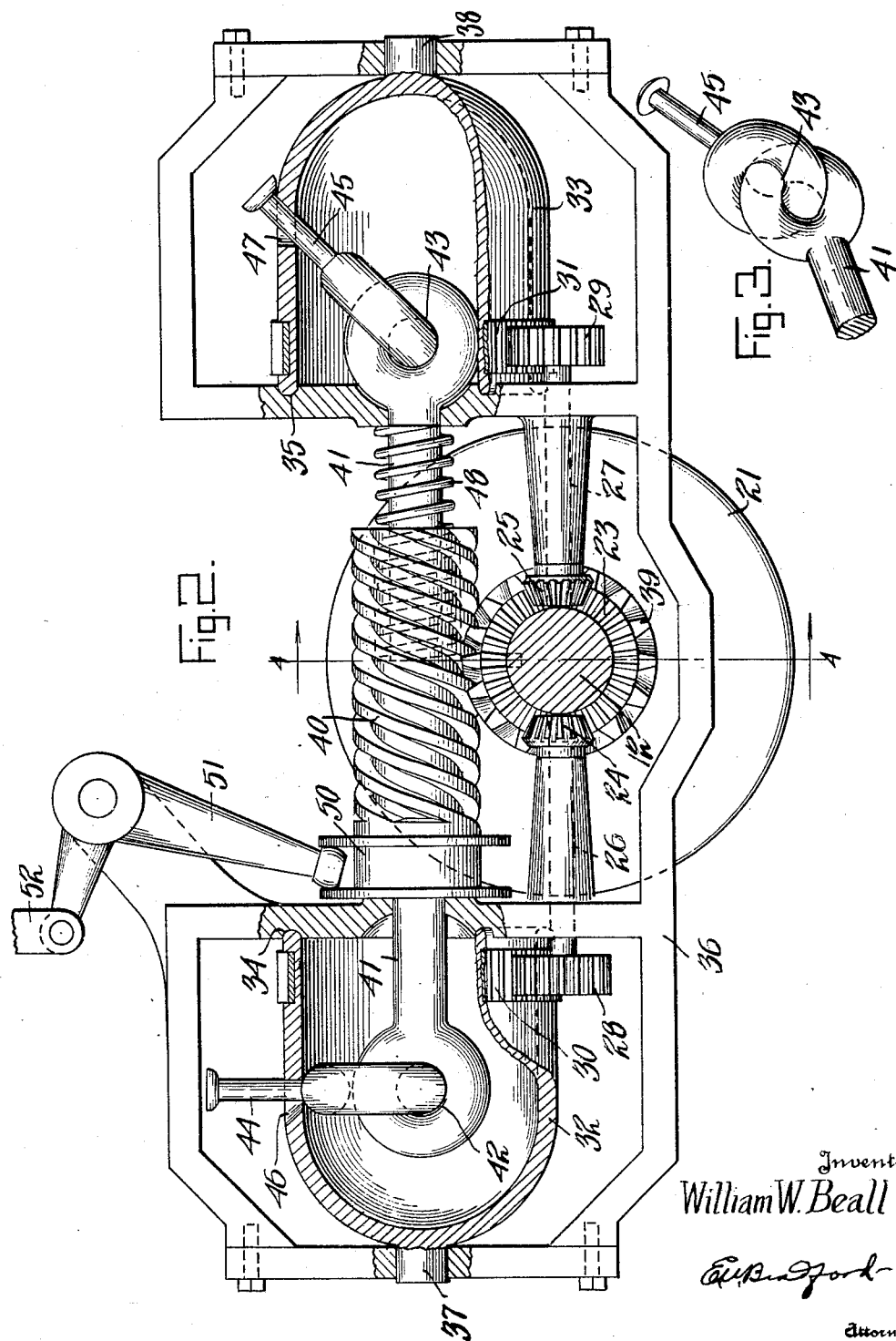
Inventor
William W. Beall May 31, 1932.  W. W. BEALL  1,861,376
AUTOMOBILE TRANSMISSION
Filed Oct. 19, 1931   4 Sheets-Sheet 3

Inventor
William W. Beall

By
Attorney

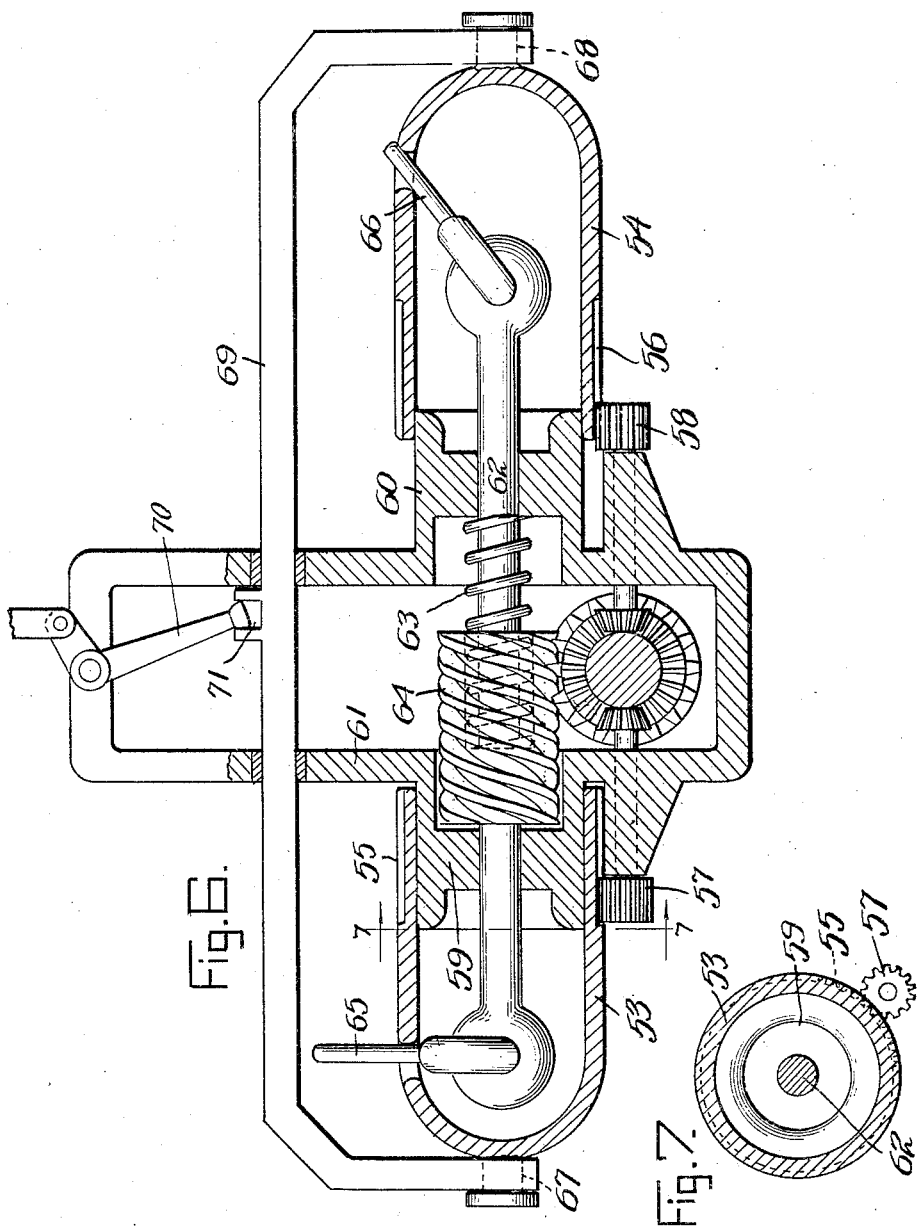

Patented May 31, 1932

1,861,376

UNITED STATES PATENT OFFICE

WILLIAM WALTER BEALL, OF MUNCIE, INDIANA

AUTOMOBILE TRANSMISSION

Application filed October 19, 1931. Serial No. 569,812.

This invention relates to automobile transmission and particularly to change speed mechanism.

An object of the invention is to eliminate the usual clutch and to effect changes in speed without shifting the gears such as is now common in automobile transmission.

A further object is to provide means to effect the various speeds, means being provided for a gradual change speed relation between the driving and the driven elements.

A still further object is to provide automatic means for controlling the relative speed of the engine and the car when ascending and descending hills, the object being to permit the engine to operate at its most advantageous speed for the grade of the road.

Figure 4:
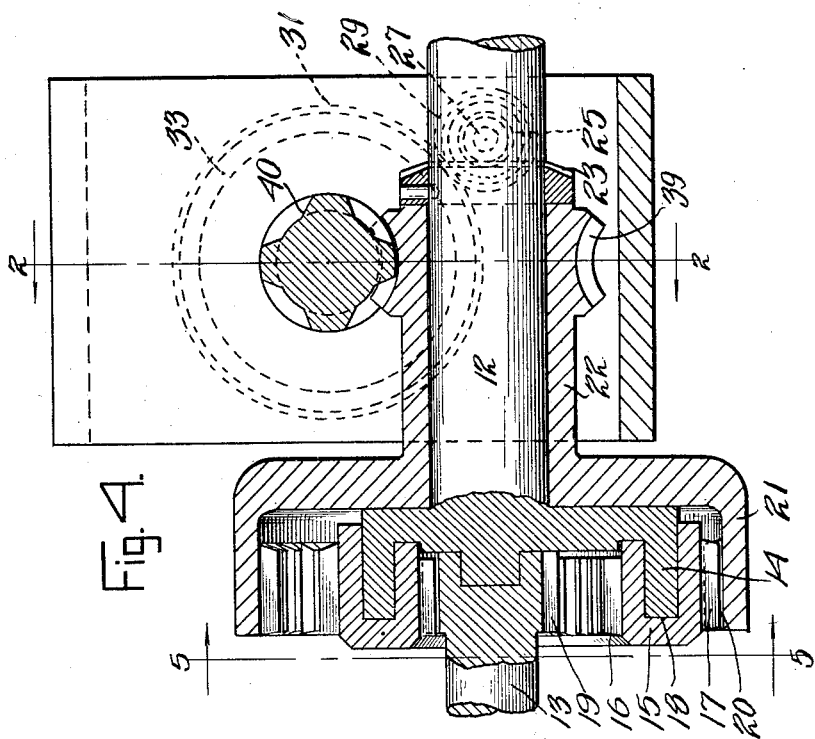
Figure 5:
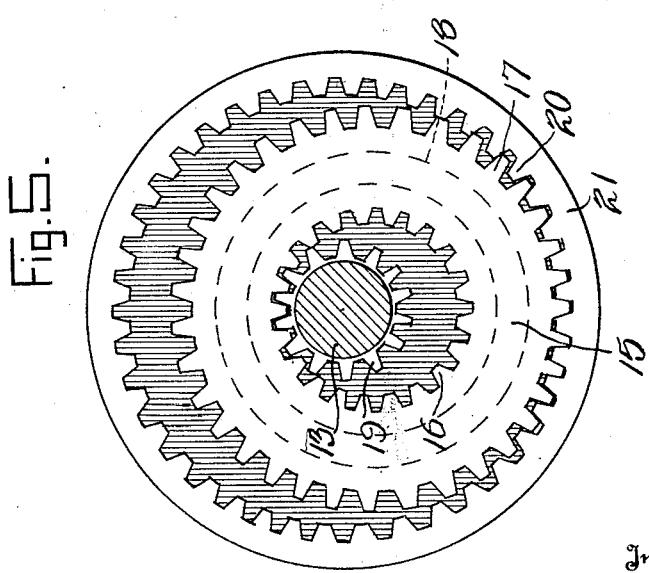

Referring to the accompanying drawings, which are made a part hereof and on which similar reference characters indicate similar parts, Figure 1 is a plan view of the chassis of an automobile showing my invention applied thereto, Figure 2, a section through the gearing on line 2—2 of Figure 1, Figure 3, a detail perspective of a universal joint, Figure 4, a section of the gearing on line 4—4 of Figure 2, Figure 5, a section on line 5—5 of Figure 4 showing the gears in elevation, and Figures 6 and 7 are sections of modified forms.

In the drawings numeral 10 indicates the chassis of an automobile upon which is mounted an engine 11. The engine has a driving shaft 12 connected directly thereto and a driven shaft 13 is connected to suitable gears in the rear axle of the machine. On the rear end of the shaft 12 is formed a cup 14. This cup is eccentrically positioned with respect to the axis of the shaft 12. A gear 15 is loosely mounted upon and carried by the cup 14, an annular rim of the cup extending into an annular groove 18 in the gear. The gear 15 is provided with internal teeth 16 and with external teeth 17. The internal teeth 16 mesh with teeth 19 of a pinion formed integral with or mounted on the shaft 13 and teeth 17 mesh with teeth 20 formed on the interior of a bell 21 which forms one end of a sleeve 22 loosely mounted on the shaft 12. The gears just described form driving connection between the shaft 12 and the shaft 13.

It will be understood from the foregoing that when the shaft 12 together with cup 14 is rotated and shaft 13 held stationary, gear 15 will roll around pinion 19 while teeth 17 meshing with teeth 20 will cause the cup 21 to revolve in the same direction, although at a slower speed due to the difference in the outside diameters of the gear 15 and the inside diameter of gear 20. With cup 21 held stationary and shaft 12 turning in one direction, shaft 13 will be rotated in the opposite direction. Various speeds may be transmitted to shaft 13 by holding cup 21 stationary, by driving it in either direction, or by retarding its speed in either direction. Mechanism now to be described is provided for operating the sleeve 22 at its various speeds.

A bevel gear 23 is secured on shaft 12. This bevel gear meshes with bevel pinions 24 and 25 secured on shafts 26 and 27 which extend in opposite directions and in alignment with each other. Pinions 28 and 29 repectively are secured on shafts 26 and 27 and mesh with gear teeth 30 and 31 which are formed on the outside of hemispherical housings 32 and 33. These housings are formed in the shape of cups. The rims of the cups are seated in grooves 34 and 35 formed in the frame 36 which provides a bearing for all of the gear elements described and later to be described.

The housings 32 and 33 are provided with stub shafts 37 and 38 which are journaled in the ends of the frame 36. From the description it will be apparent that rotation of the shaft 12 will rotate the housing 32 in one direction and the housing 33 in the opposite direction. Formed on the sleeve 22 is a worm pinion 39 with which a worm 40 on a shaft 41 meshes. The shaft 41 is journaled in the frame 36 but is arranged so as to be permitted a certain longitudinal movement in the frame. Stub shafts 44 and 45 are connected by means of universal joints 42 and 43 to the opposite ends of the shaft 41. These stub shafts project through openings 46 and 47 in the hemispherical housings 32 and 33. Surrounding one end of the shaft 41 is a compression spring 48. This spring bears at one end against a portion of the frame 36 and has its other end seated within a socket formed in the enlarged portion of the shaft 41 upon which enlarged portion is cut the worm gear 40. A collar 50 is formed on the shaft 41 within which collar engages the lower end of a bell crank lever 51. The bell crank lever is operated by means of a lever 52 which is operated in any suitable way by the operator as by pressing down upon it with his foot. Instead of the bell crank lever 51 any suitable manually operable means may be provided for shifting the shaft 41 to the right against the tension of spring 48. When the shaft 41 is in the position shown in Figure 2 rotation of the housing 32 will drive the shaft 41 in the same direction in which this housing is rotated, the housing 33, however, will be rotating in the opposite direction. This would tend to rotate the shaft 41 in the opposite direction. It should be noted, however, that with the shaft 41 in the position shown the stub shaft 45 is at an oblique angle with respect to shaft 41. Universal joint 43 therefore will permit the shaft 45 to rotate. When the shaft 41 is shifted to the right so that stub shaft 45 is at right angles to shaft 41 then stub shaft 44 will be moved to a position similar to shaft 45 and the shaft 41 will be driven in the direction opposite to that in which it moved when the parts were in the position shown in Figure 2. Rotation of the shaft 41 will rotate the sleeve 22 through the worm and worm gear connection 39 and 40. When the parts are in the position shown in Figure 2 they are in position for high speed gear. At this time rotation of the shaft 12 will drive the sleeve 22 in the opposite direction. When the shaft 41 is moved to its extreme right position driving will be through stub shaft 45 to shaft 41 and sleeve 22 will be driven in the same direction as the shaft 12 is moved. The sleeve of course will be moving, however, much slower than the shaft 12. The gear arrangement is such that when the sleeve 22 is moving at this speed there will be slow rotation of the shaft 13 in the same direction as shaft 12. This is the position for reverse.

When shaft 41 is moved slightly to the right the sleeve will move in the opposite direction to shaft 12 but at reduced speed due to the drag on the shafts 44, 45. When shaft 41 is moved to a midway position the drag of shafts 44 and 45 will be equal, causing 41 to become stationary. This is the position for average demand. The idea being to have the least possible number of moving parts most of the time.

Moving shaft 41 farther to the right, sleeve 22 will turn slowly in the same direction to shaft 12, determining intermediate and low speed for a car. Shaft 41 increases in speed as it moves to the right until sleeve 22 is rotated at a certain speed causing no turns of shaft 13 to put the car in neutral. When shaft 41 is moved to its extreme right, it is in position for reverse.

When the car is moving under excessively high load there will be a severe end thrust against the worm 40. This will tend to move the shaft 41 endwise against the tension of spring 48.

This movement of the shaft 41 will permit a partial drag on the universal joints 43 so that the shaft 41 can rotate slowly. This automatically adjusts the car for intermediate speed. When descending a hill the spring 48 will restore the shaft 41 to its position for high speed.

In the modified form shown in Figures 6 and 7 means are provided for more easily manually shifting to the several speeds, since it is not necessary to compress a spring such as 48 in Figure 2. In this form of the invention gear housings 53 and 54 are provided with relatively long gear teeth 55 and 56. The teeth remain in engagement with pinions 57 and 58 during the necessary axial movement of the gear housings. The gear housings 53 and 54 fit over and are supported and guided by lateral extensions 59 and 60 of the frame 61. The shaft 62, spring 63 and worm 64 correspond to elements shown in the form described above. Stub shafts 65 and 66 likewise extend out through openings in the respective gear housings. The outer ends of the gear housings are provided with stub shafts 67 and 68 and the ends of a yoke 69 are journaled on these shafts. The yoke 69 is moved endwise by means of a bell crank lever 70, the lower end of which engages a suitable notch or other formation 71 on the yoke. The bell crank lever is operated by the operator's foot or in any other way suitable or convenient. As will be apparent from the drawings and description just given shifting of the gear housings 53 and 54 by means of the yoke 69 will position the shaft 62 so as to determine its speed of rotation and the direction in which it rotates in the same manner as if the shaft 62 were moved endwise by the torque on the shaft due to an overload on the motor. This shifting is much easier than in the first described form since it is not made against the resistance of a spring. Of course in the form shown in Figure 2 it is necessary to have a spring with sufficient resistance to hold the shaft to the left during normal load of the car. In climbing a hill the drag on the shaft becomes greater consequently the spring must be only resistant enough to hold the shaft to the left during normal load but yieldable to permit shifting of the worm shaft under excessive load to permit changing of the speed ratio of the engine and the driving parts.

For the purpose of clearness and in order that one specific application of my invention may be disclosed, I have shown and described it in its relation to automobile transmission. I do not, however, limit myself to this one application of the invention as the same principle may be applied in other kinds of power and speed transmission devices. It should therefore be understood that the terms used are illustrative only and that the invention is held to cover all fields in which it may find utility.

Furthermore it will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A device of the kind described comprising a shaft having a bell formed on one end, a gear mounted on said bell, said gear having external and internal teeth cut thereon, a driven shaft having a gear thereon meshing with the internal teeth of the said gear, a second bell surrounding the said gear, said second bell having internal gear teeth meshing with the external gear teeth of the said gear, a worm on said second bell, a worm gear meshing therewith a gear on said driving shaft, means operable by said last-named gear for operating the said worm gear to rotate the second bell, substantially as set forth.

2. A device of the kind described comprising a shaft having a bell formed on one end, a gear mounted in said bell said gear having external and internal teeth cut thereon a driven shaft having a gear thereon meshing with the internal teeth of the said gear a second bell surrounding the said gear said second bell having internal gear teeth meshing with the external gear teeth of the said gear, a worm on said second bell, a worm gear meshing therewith, a gear on said driving shaft, a plurality of means operable by said last-named gear for operating the said worm gear in either direction to rotate the said second bell, means for manually shifting said worm axially and means operable upon shifting of said worm axially for changing its direction of rotation to change rotation of the said second bell, substantially as set forth.

3. A device of the kind described comprising a shaft having a bell formed on one end, a gear mounted in said bell, said gear having external and internal teeth cut thereon, a driven shaft having a gear thereon meshing with the internal teeth of the said gear, a second bell surrounding the said gear, said second bell having internal gear teeth meshing with the external gear teeth of the said gear, a worm on said second bell, a worm gear meshing therewith, a gear on said driving shaft, a plurality of means operable by said last-named gear for operating the said worm gear in either direction to rotate the said second bell, resilient means yieldable under excessive torque on the driven shaft for shifting said worm axially and means operable upon shifting of the worm axially for changing its direction of rotation to change direction of rotation of the said second bell to vary the relative speeds of rotation of the driving and the driven shaft, substantially as set forth.

4. A device of the kind described comprising a driving and a driven shaft, a planetary gear arrangement providing a differential speed ratio between the driving and the driven shaft, said gear connection having a surrounding bell, rotation of which controls relative speed and the direction of rotation of the driven with respect to the driving shaft, means for driving said bell from the driving shaft, said means comprising a gear on the driving shaft, a pair of bevel gears meshing therewith, a pair of housings having gear teeth cut on their peripheries, means for driving the said housings from the said gears, and a shaft operably connected to said housings to be driven thereby, said shaft having a worm engaging a worm wheel on the said bell, substantially as set forth.

5. A device of the kind described comprising a driving and a driven shaft, a planetary gear arrangement providing a differential speed ratio between the driving and the driven shaft, said gear connection having a surrounding bell, rotation of which controls relative speed and the direction of rotation of the driven with respect to the driving shaft, means for driving said bell from the driving shaft, said means comprising a gear on the driving shaft, a pair of bevel gears meshing therewith, a pair of housings having gear teeth cut on their peripheries, means for driving the said housings from the said gears, and a shaft operably connected to said housings to be driven thereby, said shaft having a worm engaging a worm wheel on the said bell, said shaft having means for drivingly connecting it with the said housings whereby upon being shifted axially it may be reversed to rotate the driven shaft in the opposite direction, substantially as set forth.

In witness whereof, I have hereunto set my hand at Muncie, Indiana, this 17th day of October, A. D. nineteen hundred and thirty-one.

WILLIAM WALTER BEALL.